United States Patent [19]

Sinkovitz et al.

[11] Patent Number: 4,804,476

[45] Date of Patent: Feb. 14, 1989

[54] PROCESS FOR CONTROLLING CALCIUM OXALATE SCALE OVER A WIDE PH RANGE

[75] Inventors: Gloria D. Sinkovitz, Bridgeville; Kevin J. Hipolit, Carnegie, both of Pa.

[73] Assignee: Calgon Corporation, Pittsburgh, Pa.

[21] Appl. No.: 111,948

[22] Filed: Oct. 23, 1987

[51] Int. Cl.$^4$ ................................................ C02F 5/14
[52] U.S. Cl. .................................... 210/697; 210/701; 252/181
[58] Field of Search ................................ 210/697–701; 252/180, 181

[56] References Cited

U.S. PATENT DOCUMENTS

| | | | |
|---|---|---|---|
| 4,575,425 | 3/1986 | Boffardi et al. | 210/697 |
| 4,634,532 | 1/1987 | Logan et al. | 210/701 |
| 4,640,793 | 2/1987 | Persinski et al. | 210/701 |

Primary Examiner—Peter Hruskoci
Attorney, Agent, or Firm—W. C. Mitchell; M. C. Sudol, Jr.

[57] ABSTRACT

This invention is directed to the use of an improved composition for inhibiting the precipitation of calcium oxalate in aqueous systems. The composition contains: (a) a water soluble phosphate; and (b) a water soluble polycarboxylate having a weight average molecular weight of about 7,000 to about 9,000; wherein the ratio of component (a) to component (b) ranges from 10:1 to 1:10.

2 Claims, No Drawings

PROCESS FOR CONTROLLING CALCIUM OXALATE SCALE OVER A WIDE PH RANGE

BACKGROUND OF THE INVENTION

Most commercial water contains alkaline earth metal cations, such as calcium, magnesium, etc., and anions such as carbonate and oxalate. When combinations of these anions and cations are present in concentrations which exceed the solubility of their reaction products, precipitates form until their product solubility concentrations are no longer exceeded. For example, when the concentrations of calcium ion and oxalate ion exceed the solubility of the calcium oxalate reaction product, a solid phase of calcium oxalate will form as a precipitate.

Solubility product concentrations are exceeded for various reasons, such as evaporation of the water phase, change in pH, pressure or temperature, and the introduction of additional ions which can form insoluble compounds with the ions already present in the solution. As these reaction products precipitate on the surfaces of a water carrying system, they form scale. Scale prevents effective heat transfer, interferes with fluid flow, facilitates corrosive processes, and harbors bacteria. Scale is an expensive problem in many industrial water systems, causing delays and shutdowns for cleaning and removal.

Calcium oxalate is a common substituent of scale which forms on the surfaces of apparatuses used for thermal treatment of aqueous solutions and suspensions. It is known that calcium oxalate scale can be removed by washing pipes, tubes, or other metallic surfaces upon which calcium oxalate deposits have formed with dilute aqueous acid solutions, such as hydrochloric acid or nitric acid solutions. However, due to the limited solubility of calcium oxalate in these acids, repeated washings are necessary. Thus, acid washing constitutes a costly and time-consuming operation. Acid washing also deteriorates equipment.

U.S. Pat. No. 4,108,680 discloses a process for removing calcium oxalate scale from metallic surfaces comprising contactng the scale with an aqueous suspension containing nitric acid and manganese dioxide at a temperature between 20° C. and 95° C. This process, like the acid washing process previously discussed, is directed to removal of calcium oxalate which has formed on metallic surfaces. These processes are not directed to prevention or inhibition of calcium oxalate precipitation.

U.S. Pat. No. 4,575,425 discloses the use of phosphate/polycarboxylate compositions to inhibit calcium oxalate precipitation. The instant invention represents an improvement over the method of the '425 patent.

Polyphosphates, such as a product which is 1.1 $Na_2O:1.0P_2O_5$, can control calcium oxalate scales up to a pH of approximately 4. However, calcium oxalate scale is difficult to control as the pH increases above 4. Since acrylates control calcium oxylate precipitation at pH's above 6.0, the most critical range for control is a pH of about 4.0 through a pH of about 6.0. The inventors have discovered that polyacrylates having a weight average molecular weight ranging between 7,000 and 9,000 are especially effective (in combination with a phosphate) for controlling calcium oxalate scaling.

It is an object of this invention to provide an improved composition and process for the inhibition of calcium oxalate precipitation at pH's greater than or equal to 2.0, especially at pH's ranging from 4.0 to 6.0.

These and other objects of the instant invention are accomplished by a process in which an effective amount of an admixture comprising: (a) a compound selected from the group consisting of water soluble phosphates and (b) a polyacrylic acid or salt thereof having a weight average molecular weight of about 7,000 to about 9,000, preferably about 8,000, is added to an aqueous system, thereby preventing the deposition and precipitation of calcium oxalate scale on metallic surfaces in contact with the aqueous system over a wide pH range.

DETAILED DESCRIPTION OF THE INVENTION

The instant invention is directed to an improved method of inhibiting the precipitation and deposition of calcium oxalate scale in an aqueous system comprising adding to said system an effective amount of an admixture comprising: (a) a compound selected from the group consisting of water soluble phosphates and (b) a polyacrylic acid or salt thereof having a weight average molecular weight of about 7,000 to about 9,000, preferbly about 8,000, wherein the ratio of component (a) to component (b) ranges from 10:1 to 1:10 by weight, and wherein the pH of said aqueous system is greater than or equal to 2.0.

The instant invention is further directed to a composition comprising: (a) a compound selected from the group consisting of water soluble phosphates and (b) a polyacrylic acid or salt thereof having a weight average molecular weight of about 7,000 to about 9,000, preferably about 8,000, wherein said composition is useful in inhibiting or preventing the precipitation and deposition of calcium oxalate scale on metallic surfaces in contact with aqueous systems over a wide pH range.

Any water soluble phosphate can be used as component (a) in the compositions of the present invention. Preferred phosphates are "molecularly dehydrated phosphates", by which is meant any phosphate which can be considered as derived from a monobasic or dibasic orthophosphate or from othrophosphoric acid, or from a mixture of any two of these by elimination of water of constitution therefrom. There may be employed alkaline metal tripolyphosphates, or pyrophosphates, or the metaphosphate which is often designated as hexametaphosphate. Any molecularly deydrated phosphate may be employed, but it is preferred to use those which have a molar ratio of alkaline metal to phosphorous methoxide from about 0.9:1 to about 2:1, the latter being the alkaline metal pyrophosphate. While it is preferred to use the metaphosphates, pyrophosphates, or polyphosphates of sodium, because they are the least expensive and most readily available, it is also possible to use the molecularly dehydrated phosphates of other metals such as potassium, lithium, cesium, or rhobidium or the ammonium molecularly dehydrated phosphates, which in many instances are classified as being alkaline metal phosphates, or the alkaline earth metal molecularly dehydrated phosphates such as those as calcium, barium, or strontium, or mixtures of alkaline metal and alkaline earth molecularly dehydrated phosphates.

Additional examples of acceptable water soluble phosphates include phosphate esters; organophosphate esters, such as the lower alkyl mono-, di- and trialkyl phosphates. The alkyl group is selected from $C_1$ to $C_4$ and may be branched or unbranched. The alkyl group may be substituted with hydroxy, amino, halide, sulfate or sulfonate, alone or in combination.

The most preferred water soluble phosphate is sodium hexametaphosphate, such as "Calgon", available from Calgon Corporation, Pittsburgh, Pa., which may be described as 1.1 $NaO_2$:1 $P_2O_5$.

The second component of the instant synergistic admixtures is a water-soluble homopolymer of acrylic acid, or salt thereof, having a weight average molecular weight of about 7,000 to about 9,000, preferably about 8,000.

The inventors have found that, in the above-defined molecular weight range, polyacrylic acid effectiveness is substantially improved.

The instant homopolymers of acrylic acid, and salts thereof, may optionally contain up to 5%, by weight, of one or more random unsaturated, polymerizable monomer(s).

The phrase "inhibiting the deposition or precipitation" is meant to include threshold inhibition, dispersion and/or solubilization of calcium oxalate scale.

The phrase "aqueous system" is meant to include any system containing water; including, but not limited to, cooling water systems, boilers, desalination systems, gas scrubbers, blast furnaces, sewage sludge thermal conditioning equipment, reverse osmosis systems, sugar evaporators, paper processing circuits, mining circuits and the like.

The weight ratio of component (a) to component (b) should be about 10:1 to about 1:10, preferably 1.5:1 to 1:1.5.

An effective amount of the calcium oxalate inhibitor disclosed herein means that level of inhibitor necessary to prevent deposition or precipitation of calcium oxalate in the system being treated. Treatment levels can be as high as 1,000 ppm. The preferred treatment level is from 0.1 to 10 ppm.

Unexpectedly, the instant compositions provide enhanced control of calcium oxalate scaling when compared to the compositions described in U.S. Pat. No.4,575,425. Thus, the instant compositions are substantially more effective as calcium oxalate scale inhibitors at pH's greater than or equal to 2.0. These inhibitors are especially effective as scale inhibitors in the pH range of 4.0 to 6.0. It is noteworthy that polyphosphonates alone can control scales up to a pH of approximately 4 and that polyacrylates alone can control calcium oxalate precipitation at pH's in excess of 6. Thus, the critical range for complete control of calcium oxalate precipitation includes pH's from approximately 4.0 through approximately 6.0. Calcium oxalate precipitation is not controlled throughout this range by components (a) or (b) of the instant admixtures individually.

The preferred compositions comprise sodium hexametaphosphate and a homopolymer of acrylic acid having a weight average molecular weight of from about 7,000 to about 9,000, and salts of these polymers.

These preferred compositions are effective inhibitors over a pH range of from 2.0 to 12.0.

The temperature of the system being treated is not critical to the effectiveness of the instant inhibitors, if below the temperature at which the individual components employed thermally destruct.

Though it is preferred to treat aqueous systems with admixtures comprising components (a) and (b), as described earlier, these components may be added separately to the system being treated without departing from the spirit of this invention.

EXAMPLES

The following examples illustrate the present invention in greater detail. It should be understood that the invention is not in any way limited by these examples.

The following abbreviations and product names are used in the examples and are defined as indicated:

PAA-L=polyacrylic acid, (Mw) of approximately 2,000 as determined by gel permeation chromatography, partially neutralized to pH 3.0.

PAA-H=polyacrylic acid, (Mw) of approximately 8,000 as determined by gel permeation chromatography, neutralized to pH 7.0

PP=polyphosphate; this product, which is manufactured by Calgon Corporation, Pittsburgh, Pa., under the tradename Calgon, is defined as 1.1 $Na_2O$:1 $P_2O_5$.

EXAMPLES 1-20

Threshold inhibition flask tests were run for calcium oxalate. Due to the increased solubility of oxalate at pH's less than 4, a 3.5 millimole concentrate of calcium and oxalate ions was used to induce scaling. Solution pH was adjusted to within 0.2 units of the desired test pH prior to addition of inhibitor being treated. After addition of the inhibitor, the cation ($CaCl_2$) was added and the pH was adjusted to within 0.05 units of the desired pH. The flasks were then loosely capped and incubated for 24 hours at 62° C. Before titration, to determine the ppm of Ca remaining in solution, precipitated calcium oxalate was removed by filtering aliquots of all solution through a 0.45 μm membrane. Final pH of the unfiltered test solution was considered to be the actual test pH. All inhibitor concentrations were calculated on an active basis.

Table 1, below, shows the results of examples 1-20. In examples 1-7 polyacrylic acid (PAA) alone was used as the inhibitor. In examples 8-13 polyphosphate (PP) was used as the sole inhibitor. In examples 17-20 a 1:1 combination by weight of a low molecular weight polyacrylic acid and polyphosphate was used as the inhibitor.

TABLE I

| Example | Inhibitor (weight ratio) | pH | % Calcium Oxalate Inhibition at Designated Dosage (ppm of Inhibitor In Solution, weight basis) | | |
|---|---|---|---|---|---|
| | | | (1 ppm) | (3 ppm) | (5 ppm) |
| 1 | PAA-L | 4.0 | 22.0 | 26.0 | 35.0 |
| 2 | PAA-L | 5.0 | 35.0* | 74.8* | 77.0* |
| 3 | PAA-L | 6.0 | 75.0 | 94.0 | 97.0 |
| 4 | PAA-L | 7.0 | 97.0 | 94.0 | 96.0 |
| | | | (1 ppm) | (5 ppm) | (15 ppm) |
| 5 | PAA-L | 8.5 | 66.0* | 67.5* | 82.5* |
| 6 | PAA-L | 10.0 | 81.0 | 75.5 | 84.5 |
| | | | (20 ppm) | (50 ppm) | (100 ppm) |
| 7 | PAA-L | 11.3 | 100.0 | 100.0 | 100.0 |
| 8 | PP | 2.0 | 100.0 | 100.0 | 100.0 |
| 9 | PP | 3.0 | 98.0 | 98.0 | 97.5 |
| 10 | PP | 4.0 | 93.5* | 93.5* | 93.0* |
| 11 | PP | 4.5 | 85.0 | — | — |
| 12 | PP | 5.0 | 9.5* | 60.0* | 62.5* |
| 13 | PP | 6.0 | No inhibition | 45.0 | 4.0 |
| | | | (1 ppm) | (5 ppm) | (15 ppm) |
| 14 | PP | 7.0 | 3.5* | 33.0* | 51.0* |
| 15 | PP | 8.5 | 1.5* | 53.5* | 69.0* |
| 16 | PP | 10.0 | 11.5* | 20.0* | 0.5* |
| 17 | PP/PAA-L (1:1) | 4.0 | 97.0 | 98.0 | 100.0 |

TABLE I-continued

| Example | Inhibitor (weight ratio) | pH | % Calcium Oxalate Inhibition at Designated Dosage (ppm of Inhibitor In Solution, weight basis) | | |
|---|---|---|---|---|---|
| 18 | PP/PAA-L (1:1) | 5.0 | 97.0 | 87.0 | 89.0 |
| 19 | PP/PAA-L (1:1) | 5.5 | — | 87.0 | 98.0 |
| 20 | PP/PAA-L (1:1) | 6.0 | 95.0 | 98.0 | 98.0 |

*represents an average of 2 data points

EXAMPLE 21

Supersaturated solutions of calcium oxalate containing 110 mg/L oxalate ion and 20 mg/L calcium ion were prepared. Papermill water was synthesized which contained 2,000 mg/L sodium, 3,000 mg/L chloride and 200 mg/L sulfate ions. The supersaturated oxalate solutions were combined with synthesized mill water to conduct these tests.

Standard calcium oxalate flask tests were then run, in accordance with the procedure described for Examples 1–20, for high and low molecular weight polyacrylic acid/polyphosphate inhibitors to compare the performance of these inhibitors. The results are shown in Table II.

TABLE II

| | | $CaC_2O_4$ Inhibition | | | | | | |
|---|---|---|---|---|---|---|---|---|
| | Active Dosage | pH | | | | | | |
| Inhibitor | ppm | 4.5 | 5.0 | 5.5 | 6.0 | 6.5 | 7.0 | 7.5 |
| PP/PAA-L (1:1) | 0.5 | — | — | 34 | — | 68, 61 | 62, 78 | 71 |
| | 1.0 | — | — | 45 | 66 | 100, 98 | 100 | 100 |
| | 1.5 | — | — | — | — | 100 | — | — |
| | 2.0 | — | — | 69 | 92 | — | — | — |
| | 4.0 | — | — | 74 | 98 | — | — | — |
| | 6.0 | — | — | 91 | 98 | — | — | — |
| | 8.0 | 78 | 65 | 100 | — | — | — | — |
| | 10.0 | 86 | 65, 70 | — | — | — | — | — |
| | 12.0 | 90 | 80, 90 | — | — | — | — | — |
| | 14.0 | 94 | — | — | — | — | — | — |
| | 16.0 | 98 | — | — | — | — | — | — |
| PP/PAA-H (1:1) | 0.5 | — | — | 67 | 71 | 100, 90 | 84, 100 | 100 |
| | 1.0 | — | — | 90 | 94 | 100, 100 | 100 | 100 |
| | 2.0 | 82 | 75, 81 | 100 | 100 | — | — | — |
| | 3.0 | — | — | 100 | — | — | — | — |
| | 4.0 | 100 | 100, 100 | 100 | 100 | — | — | — |
| | 6.0 | 100 | — | | | | | |

What is claimed is:

1. In a method of inhibiting the precipitation and deposition of calcium oxalate scale in an aqueous system comprising adding to said system an effective amount of (a) sodium hexametaphosphate and b) a homopolymer of acrylic acid or salt thereof a weight average molecular weight of from about 7,000 to about 9,000.

2. The method of claim 1 wherein said effective amount ranges from 0.1 to 1,000 ppm, based on the weight of said aqueous system.

* * * * *